(12) United States Patent
Miyahara

(10) Patent No.: US 7,837,184 B2
(45) Date of Patent: Nov. 23, 2010

(54) VEHICULAR FLUID SEALED ENGINE MOUNT

(75) Inventor: Tetsuya Miyahara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 370 days.

(21) Appl. No.: 11/253,264

(22) Filed: Oct. 18, 2005

(65) Prior Publication Data

US 2006/0082036 A1     Apr. 20, 2006

(30) Foreign Application Priority Data

Oct. 19, 2004    (JP) ............................ P.2004-304617

(51) Int. Cl.
*F16F 5/00* (2006.01)
*F16F 7/00* (2006.01)

(52) U.S. Cl. ............................... 267/140.13; 267/140.4

(58) Field of Classification Search ............ 267/140.11, 267/140.13, 140.3, 140.4, 141
See application file for complete search history.

(56) References Cited

U.S. PATENT DOCUMENTS

| | | | | |
|---|---|---|---|---|
| 4,645,188 A | * | 2/1987 | Jordens ................. | 267/140.13 |
| 5,489,086 A | * | 2/1996 | Kanda .................... | 267/140.12 |
| 5,731,927 A | * | 3/1998 | Kaneko .................... | 360/98.08 |
| 6,120,011 A | * | 9/2000 | Maeno et al. ........... | 267/140.11 |
| 6,325,364 B1 | * | 12/2001 | Muramatsu ............ | 267/140.14 |
| 6,499,729 B1 | * | 12/2002 | Walterbusch ........... | 267/140.13 |
| 6,962,229 B2 | * | 11/2005 | Miyahara ................. | 180/291 |
| 2003/0011115 A1 | * | 1/2003 | Akasa et al. ........... | 267/140.11 |
| 2005/0225015 A1 | * | 10/2005 | Sakata .................... | 267/140.13 |

FOREIGN PATENT DOCUMENTS

| | | |
|---|---|---|
| JP | 01-178251 | 12/1989 |
| JP | 2000-257665 | 9/2000 |
| JP | 2001-193783 | 7/2001 |
| JP | 2002-127762 | 5/2002 |

* cited by examiner

*Primary Examiner*—Melody M Burch
(74) *Attorney, Agent, or Firm*—Carrier, Blackman & Associates P.C.; William D. Blackman; Joseph P. Carrier

(57) ABSTRACT

A vehicular fluid sealed engine mount 10 includes a first mount member 11 to be mounted on an engine EG, a second mount member 12 to be mounted on a body BD, a resilient member 13 which connects between the first and second mount members, a diaphragm 14 fixed to the second mount member far away from the resilient member, a fluid chamber 15 defined by the resilient member and the diaphragm and a partition member 18 fixed to the second mount member in such a manner as to partition the fluid chamber into a main fluid chamber 16 and an auxiliary fluid chamber 17. The second mount member and the partition member have brittle portions 45, 46 which are deformed or broken when a load En is applied thereto from a direction which intersects with an axial direction of the vehicular fluid sealed engine mount at right angles.

5 Claims, 7 Drawing Sheets

VEHICULAR FLUID SEALED ENGINE MOUNT

CROSS-REFERENCE TO RELATED APPLICATIONS

The present application claims priority under 35 USC §119 based on Japanese patent application No. 2004-304617, filed on Oct. 19, 2004. The entire subject matter of this priority document is herein incorporated by reference.

BACKGROUND OF THE INVENTION

1. Field of the Invention

The present invention relates to a vehicular fluid sealed engine mount which is used to mount an engine on a body of a vehicle.

2. Description of the Background Art

Engines of vehicles generate various types of vibrations which differ largely in frequency and amplitude according to engine revolution speeds. In recent years, there have been in progress developments of vehicular fluid sealed engine mounts which can absorb a wide range of vibrations generated by engines (for example, refer to Patent Document No. 1).

[Patent Document No. 1]
JP-A-2001-193783

These general vehicular fluid sealed engine mounts are such that a first mount member adapted to be mounted on a power source and a second mount member which is cylindrical and is adapted to be mounted on a body are connected to each other via a resilient member such as a rubber, a fluid chamber is provided by a diaphragm mounted on the second mount member and the resilient member, the fluid chamber so provided is partitioned by a partition member into a main fluid chamber and an auxiliary fluid chamber, and the main fluid chamber and the auxiliary fluid chamber are made to communicate with each other via two orifices.

When the engine revolves in a high engine revolution speed area, a working fluid is allowed to pass between the main fluid chamber and the auxiliary fluid chamber only via one of the orifices so as to damp the vibrations of the engine. In addition, when the engine revolves in a low engine revolution speed area (idling speed area), the working fluid is allowed to pass between the main fluid chamber and the auxiliary fluid chamber via the two orifices so as to damp the vibrations of the engine.

Incidentally, when the vehicle is involved in a collision, impact energy is also applied to the engine mount which is interposed between the body, which is deformed by virtue of the impact energy applied thereto, and the engine. Since the fluid sealed engine mount has a larger number of components accommodated in the interior thereof, the fluid sealed engine mount may sometime function as a rigid body rather than an impact absorbing member. Consequently, it has been desired that fluid sealed engine mounts also have an improved energy absorbing performance.

SUMMARY OF THE INVENTION

A problem the invention is to solve is to provide a technique of how to increase further the impact energy absorbing performance of a vehicular fluid sealed engine mount of absorbing impact energy (impact load) applied to the vehicular fluid sealed engine mount in a direction which intersects with the axial direction of the engine mount at right angles.

According to a first aspect of the invention, there is provided a vehicular fluid sealed engine mount comprising: a first mount member adapted to be mounted on a power source or a body; a second mount member which is cylindrical and is adapted to be mounted on the body or the power source, the second mount member includes a hollow space formed therein; a resilient member which connects between the first and second mount members; a diaphragm fixed to the second mount member spaced away from the resilient member; a fluid chamber defined by at least the resilient member and the diaphragm; and a partition member fixed to the second mount member in such a manner as to partition the fluid chamber into a main fluid chamber which faces the resilient member and an auxiliary fluid chamber which faces the diaphragm; an orifice being provided in the partition member which communicates between the main fluid chamber and the auxiliary fluid chamber; wherein a brittle portion is provided on at least either the second mount member or the partition member which is adapted to be deformed or broken when a load of a certain magnitude or larger is applied thereto in a direction which intersects with an axial direction of the vehicular fluid sealed engine mount at right angles; wherein the resilient member is formed with a receiving portion to receive the first mounting member; wherein the second mounting member surrounds a portion of the resilient member; and contains the surrounded portion within the hollow space.

According to a second aspect of the invention, there is provided a vehicular fluid sealed engine mount as set forth in the first aspect of the invention, wherein the partition member is made up of a substantially cup-like member which is concentric with the second mount member which is cylindrical, and wherein a bottom plate of the cup-like member is formed into a tapered shape so as to make the bottom plate constitute the brittle portion.

According to a third aspect of the invention, there is provided a vehicular fluid sealed engine mount as set forth in the first or second aspect of the invention, wherein the partition member comprises at least either a slit formed in an axial end face thereof or an axial slit formed in an outer circumferential surface thereof, so that these slits are made to constitutes the brittle portion.

According to a fourth aspect of the invention, there is provided a vehicular fluid sealed engine mount as set forth in the first aspect of the invention, wherein the second mount member has one or a plurality of axial slits formed in a portion on an outer circumferential surface thereof to which impact energy is to be applied, so that the one or the plurality of slits so formed are made to constitute the brittle portion.

According to a fifth aspect of the invention, there is provided a vehicular fluid sealed engine mount as set forth in the first or fourth aspect of the invention, wherein the second mount member comprises a cylindrical inner tube which is integrated with the resilient member and a cylindrical outer tube which accommodates therein the inner tube and which is mounted on the body, wherein a gap is provided between an outer surface of the inner tube and an inner surface of the outer tube, and wherein the inner tube and the outer tube are connected to each other by superposing a mounting surface of the inner tube on the outer tube in an axial direction.

According to a sixth aspect of the invention, there is provided a vehicular fluid sealed engine mount as set forth in the fifth aspect of the invention, wherein a resilient material such as a rubber is filled in the gap.

According to the first aspect of the invention, since the brittle portion is provided on at least either the second mount member or the partition member which is adapted to be deformed or broken when a load of a certain magnitude or larger is applied thereto in the direction which intersects with the axial-direction of the vehicular fluid sealed engine mount at right angles, when impact energy (impact load) is applied to the vehicular fluid sealed engine mount in the direction which intersects with the axial direction of the same engine mount at right angles, the second mount member and/or the partition member can easily be deformed or broken earlier than the other members. As a result, the impact energy absorbing performance by the fluid sealed engine mount can be enhanced sufficiently.

According to the second aspect of the invention, the partition member is made up of the substantially cup-like member which is concentric with the second mount member which is cylindrical, and the bottom plate of the cup-like member is formed into the tapered shape so as to make the bottom plate constitute the brittle portion.

When impact energy is applied to the vehicular fluid sealed engine mount in the direction which intersects with the axial direction of the same engine mount at right angles, the impact energy so applied is then applied to the partition member via the second mount member. Since the bottom plate is made to function as the brittle portion, the bottom plate of the partition member can easily be deformed or broken earlier than the other portions thereof. As a result, the impact energy can be absorbed sufficiently through the deformation or breakage of the entirety of the partition member as well.

Furthermore, the brittle portion can be provided through the extremely simple configuration in which the partition member is made up only of the substantially cup-like member, and the bottom plate is only formed into the tapered shape.

According to the third aspect of the invention, the partition member is made to comprise at least one of the slit formed in the axial end face thereof and the axial slit formed in the outer circumferential surface thereof, so that these slits are made to constitutes the brittle portion.

When impact energy is applied to the vehicular fluid sealed engine mount in the direction which intersects with the axial direction of the same engine mount at right angles, the impact energy so applied is then applied to the partition member via the second mount member. Since the slit is made to constitute the brittle portion, the partition member can easily be deformed or broken from the portion having the slit as a base point. As a result, the impact energy can be absorbed sufficiently through the deformation or breakage of the entirety of the partition member as well.

Furthermore, the brittle portion can be provided through the extremely simple configuration in which only the slit is formed in the partition member.

According to the fourth aspect of the invention, one or the plurality of axial slits are formed in the portion on the outer circumferential surface of the second mount member to which impact energy is to be applied, so that the one or the plurality of slits so formed are made to constitute the brittle portion.

When impact energy is applied to the vehicular fluid sealed engine mount in the direction which intersects with the axial direction of the same engine mount at right angles, the second member can easily be deformed or broken from the portion having the slit as a base point. As a result, the impact energy can be absorbed sufficiently through the deformation or breakage of the entirety of the partition member as well.

Furthermore, the brittle portion can be provided through the extremely simple configuration in which only the slit is formed in the outer circumferential surface of the second member.

According to the fifth aspect of the invention, the second mount member is made to comprise the cylindrical inner tube which is integrated with the resilient member and the cylindrical outer tube which accommodates therein the inner tube and which is mounted on the body, the gap is provided between the outer surface of the inner tube and the inner surface of the outer tube, and the inner tube and the outer tube are connected to each other by superposing the mounting surface of the inner tube on the outer tube in the axial direction.

Since the gap is provided between the outer surface of the inner tube and the inner surface of the outer tube, When impact energy is applied to the vehicular fluid sealed engine mount in the direction which intersects with the axial direction of the same engine mount at right angles, the inner tube does not restrain the radial deformation of the outer tube.

In addition, since the gap is provided, there is no need to support the inner tube by the outer tube as in a case where the inner tube rigidly fits in (press fits in), and no stress due to the fitting (press fitting) load is generated. Due to this, the thickness of the outer tube can be reduced.

From these facts, the outer tube can easily be deformed in a radial direction. As a result, the impact energy can sufficiently be absorbed by virtue of the deformation or breakage of the second mount member. Moreover, since the outer tube can be deformed in the radial direction, it is possible to reduce the energy maximum value (the peak value) in the initial stage of application of impact energy to the vehicular fluid sealed engine mount.

According to the sixth aspect of the invention, since the resilient material such as a rubber is filled in the gap, the resonance of the inner tube can be suppressed by the resilient member.

DETAILED DESCRIPTION OF THE PREFERRED EMBODIMENTS

A best mode for carrying out the invention will be described based on the accompanying drawings.

Figure 1:
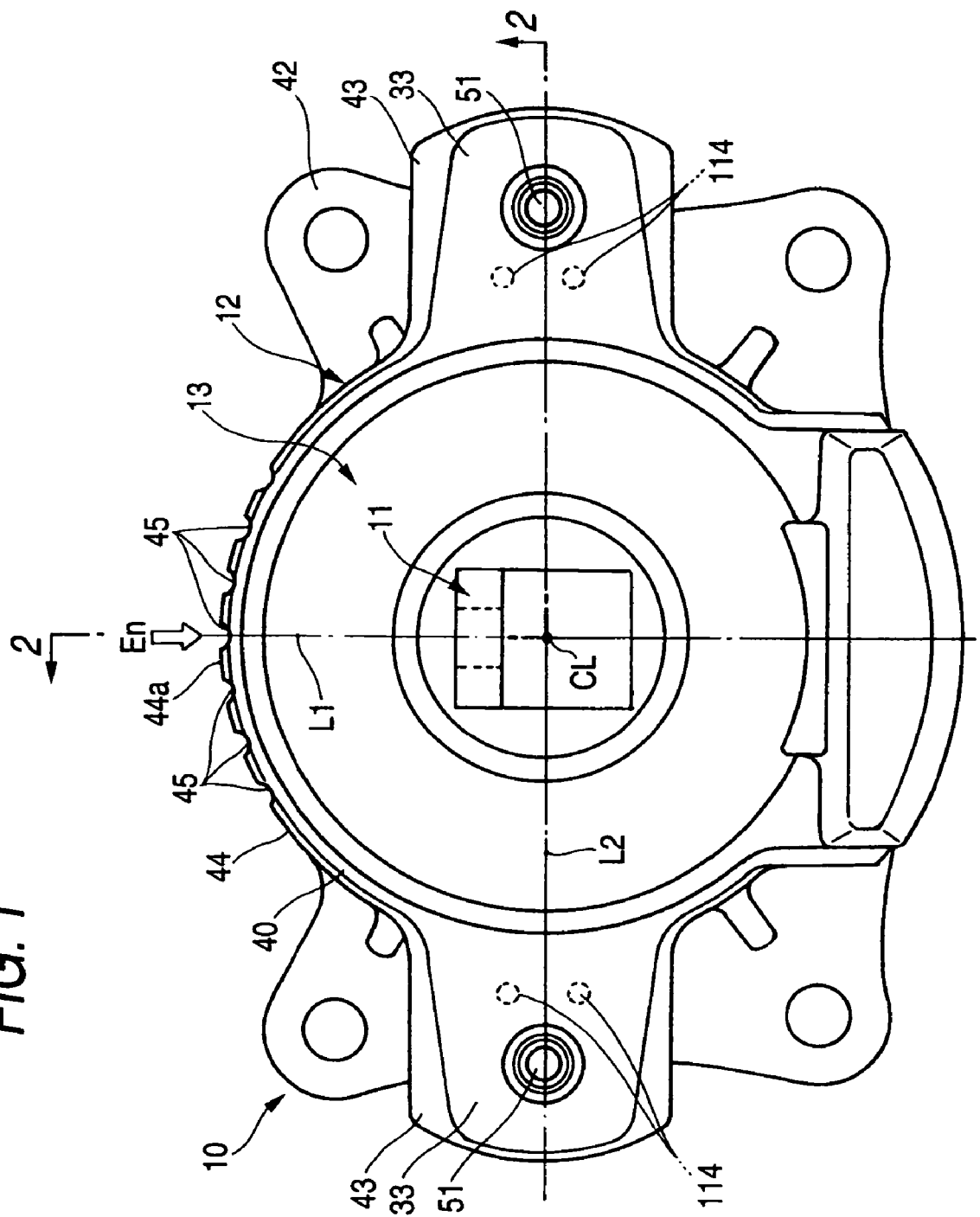
FIG. 1 is a plan view of a vehicular fluid sealed engine mount according to the invention.
Figure 2:
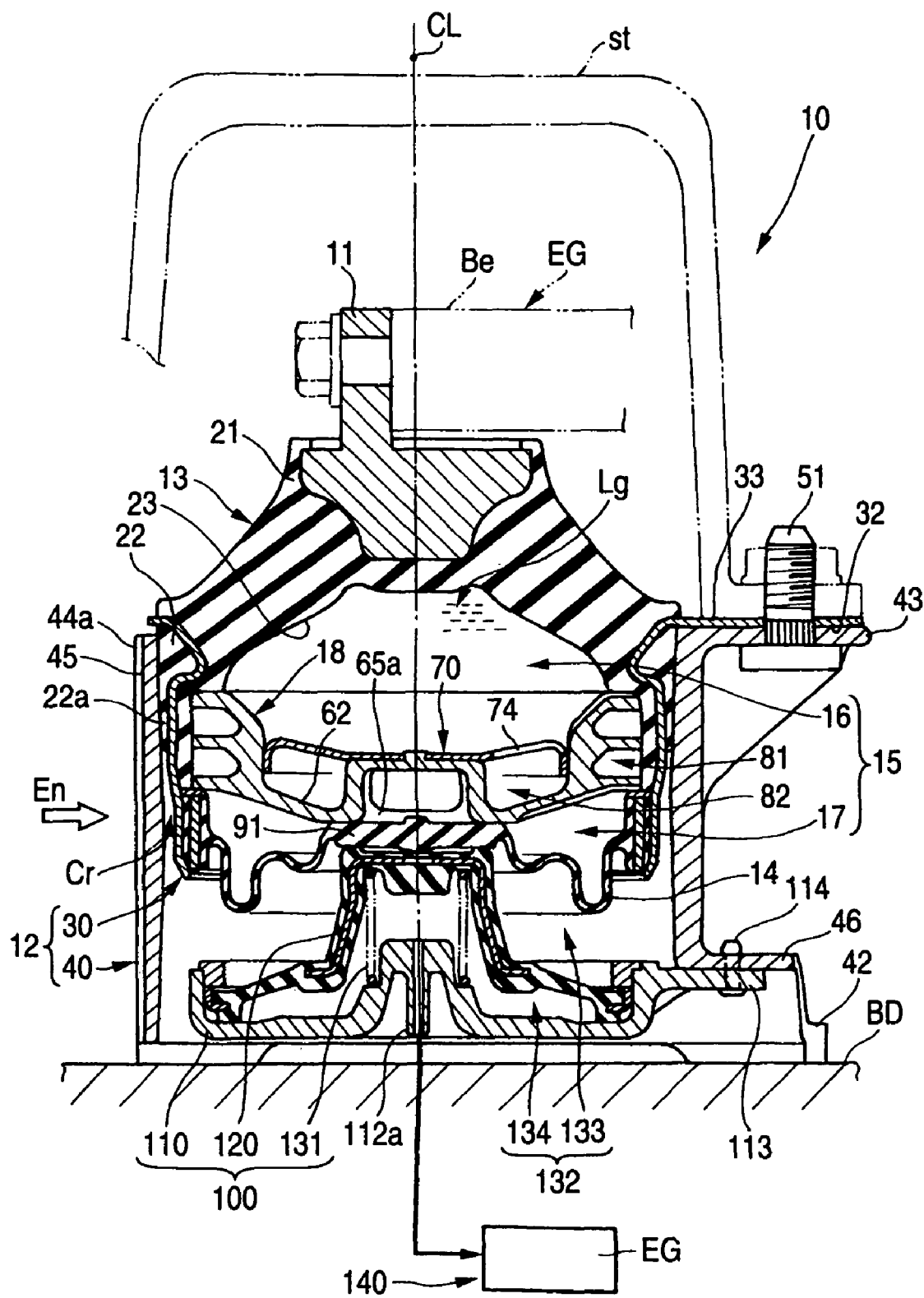
FIG. 2 is a sectional view taken along the line 2-2 in FIG. 1.
Figure 3:
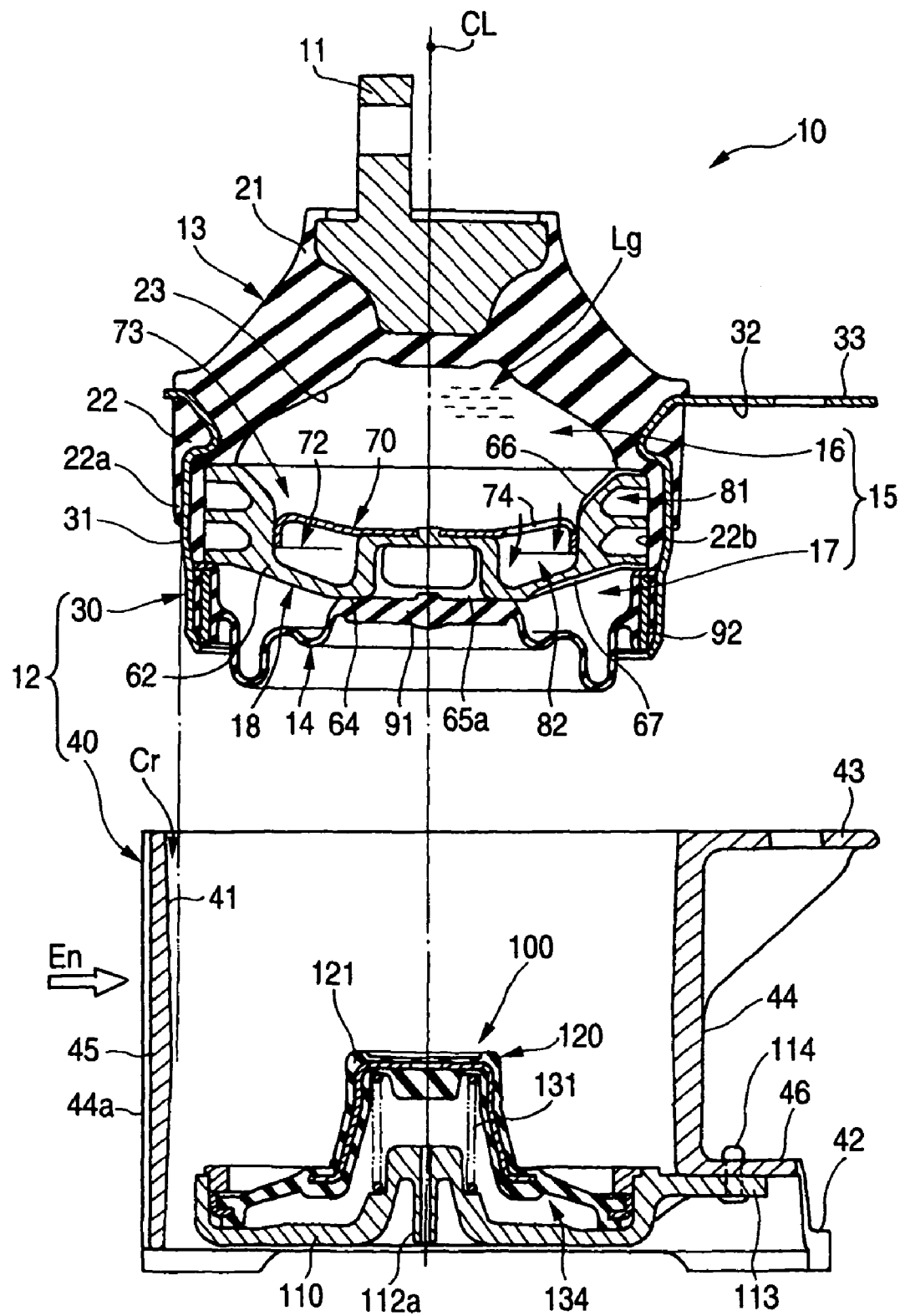
FIG. 3 is an exploded view of the vehicular fluid sealed engine mount according to the invention.

FIG. 1 is a plan view of a vehicular fluid sealed engine mount according to the invention. FIG. 2 is a sectional view taken along the line 2-2 in FIG. 1. FIG. 3 is an exploded view of the vehicular fluid sealed engine mount according to the invention, which is shown in a way that corresponds to FIG. 2.

As shown in FIGS. 1 and 2, a vehicular fluid sealed engine mount 10 is an anti-vibration support mechanism which is disposed between a front part of a body BD and a front part of an engine EG in a vehicle (an FF vehicle) which has a drive system in which front wheels are driven by the engine EG mounted at the front part of the body BD so as to support the engine EG while preventing the vibration thereof.

The vehicular fluid sealed engine mount 10 like this (hereinafter, simply referred to as the engine mount 10) includes a first mount member 11 which is mounted on the engine EG as a power source, a second mount member 12 which is cylindrical and is mounted on the body BD, a resilient member 13 which connects between these first and second mount members 11, 12, a diaphragm 14 which is fixed to the second mount member far away from the resilient member 13, at least a fluid chamber 15 partitioned by the resilient member 13 and the diaphragm 14 and a partition member 18 which is fixed to the second mount member 12 in such a manner as to partition the fluid chamber 15 into a main fluid chamber 16 which faces the resilient member 13 and an auxiliary fluid chamber 17 which faces the diaphragm 14.

These first and second mount members 11, 12, the resilient member 13, the diaphragm 14, the fluid chamber 15 and the partition member 18 are such as to be aligned on a vertical axial center CL of the engine mount 10. The main fluid chamber 16 and the auxiliary fluid chamber 17 are spaces in which a working fluid Lg is sealed.

Hereinafter, the engine mount 10 will be described.

The first mount member 11 is a member that is mounted on the engine EG via an engine bracket Be.

The resilient member 13 is a rubber block adapted to absorb vibrations transmitted between the first mount member 11 and the second mount member 12 by being resiliently deformed. This resilient member 13 is a generally bell-shaped member whose diameter is increased from an upper end portion 21 thereof with which the first mount member is integrated to a lower end portion 22 thereof and has at the lower end portion 22 a cavity portion 23 which widely opens downwards. The lower end portion 22 exhibits a cylindrical shape.

As shown in FIGS. 2 and 3, the second mount member 12 is made up of a cylindrical inner tube 30 which is integrated with the resilient member 13 and a cylindrical outer tube 40 which accommodates therein the inner tube 30 and which is mounted on the body BD and has a certain minute gap Cr between an outer surface 31 of the inner tube 30 and an inner surface 41 of the outer tube 40, and the inner tube 30 and the outer tube 40 are connected to each other by superposing a mounting surface 32 of the inner tube 30 on the outer but 40 in an axial direction (namely, in the vertical direction of the engine mount 10).

A resilient material 22a such as a rubber is filled in the gap Cr (including a construction in which the resilient material 22a is press fitted not strongly). Hereinafter, a detailed description will be made.

The inner tube 30 is a relatively thin core metal which is partially embedded in the cylindrical lower end portion 22 of the resilient member 13 and in which flat plate-like inner tube flanges 33, 33 (refer to FIG. 1, as well) which extend from an upper end to left and right sides thereof are formed integrally.

Figure 4A:
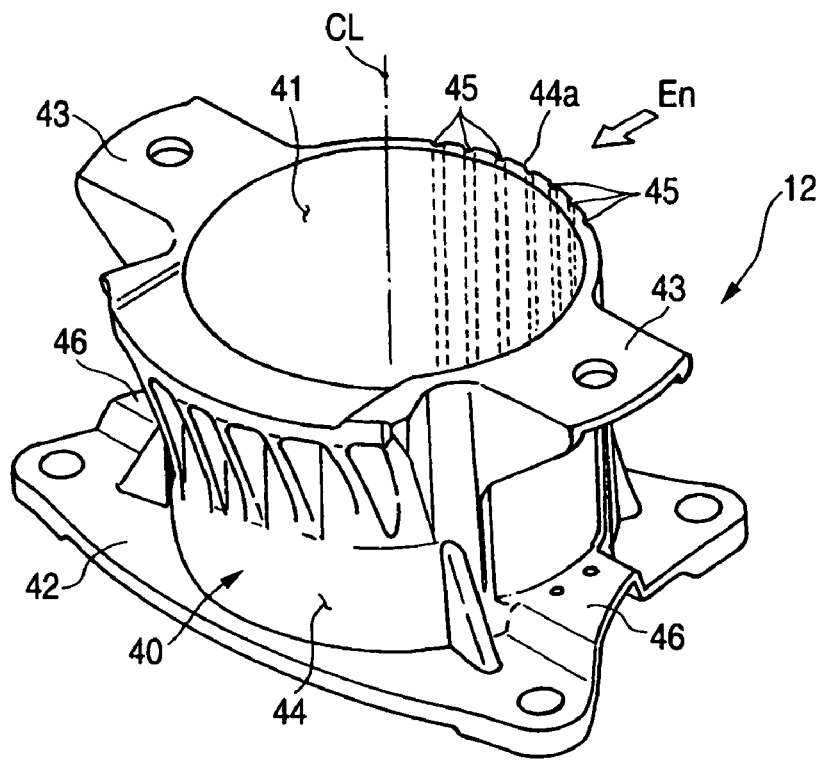
FIGS. 4A and 4B are drawings showing the configuration of an outer tube according to the invention.
Figure 4B:
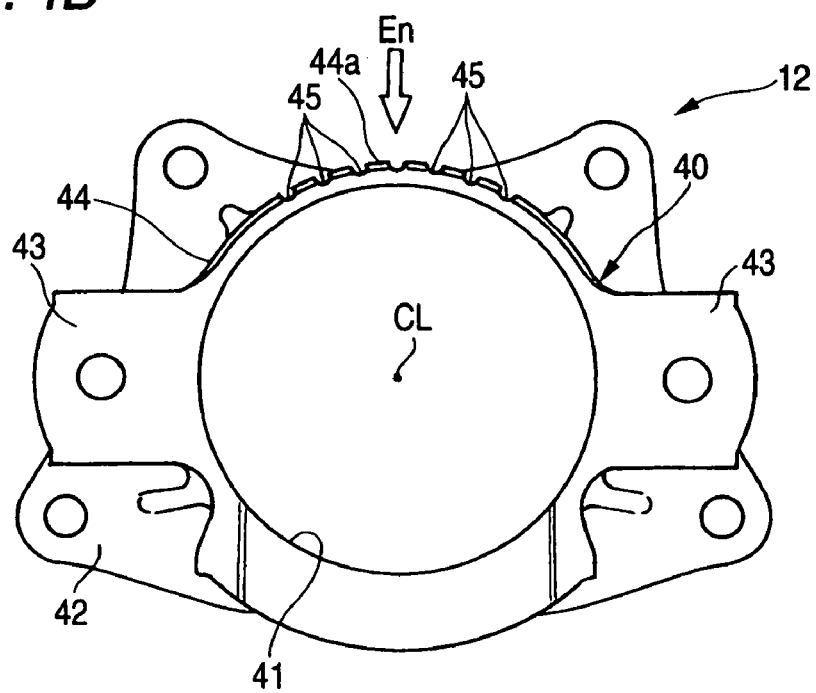

FIGS. 4A and 4B are drawings showing the configuration of the outer tube according to the invention, and FIG. 4A shows an overall configuration of the outer tube 40 as seen from the rear top thereof, whereas FIG. 4B shows the outer tube as seen from the top thereof.

As shown in FIGS. 3 and 4, the outer tube 40 is a member which includes integrally a horizontal body mounting flange 42 which is formed on an outer circumference of a lower end thereof and horizontal left and right inner tube mounting flanges 43, 43 which are formed on an outer circumference of an upper end thereof and in which a hole passes therethrough in a vertical direction. The outer tube 40 which is configured as is described above is a light member such as a cast product of an aluminum alloy and a molded product of a resin.

The outer tube 40 can be mounted on the body BD by superposing the body mounting flange 42 on the body from thereabove and fastening the flange 42 to the body BD with bolts.

The second mount member 12 is characterized in that one or a plurality of axial slits 45 . . . are formed in a portion on an outer circumferential surface 44 of the outer tube to which an impact energy En is applied, that is, a portion 44a which faces the front of the vehicle so as to constitute a brittle portion.

To be more specific, the slits 45 . . . are thin elongated vertical grooves which are formed over a full range of the outer tube 40 from the upper end to the lower end thereof. The sectional shape and size of the vertical groove may be set appropriately so as to provide an optimal effect. A first brittle portion made up of the slits 45 . . . is such as to be deformed or broken as a result of the concentration of stress which results when the impact energy En (load) of a certain magnitude or greater is applied thereto from a direction which intersects with an axial direction (the axial center CL) of the engine mount 1, that is, a direction indicated by a thick white arrow which is outlined with a black solid line.

As shown in FIGS. 2 and 3, the inner tube 30 can be fixed to the outer tube 40 by inserting the inner tube 30 which is incorporated in the resilient member 13 into the outer tube 40 from above so that the inner tube flanges 33, 33 are superposed on the inner tube mounting flanges 43, 43 of the outer tube 40 in the axial direction and connecting the flanges together with a plurality of bolts 51 . . . .

Since the outer tube 40 is a through hole whose diameter is larger than that of the inner tube 30, a certain minute gap Cr is provided between the outer surface of the inner tube 30 and the inner surface 41 of the outer tube 40, as shown in FIG. 3. Part of the resilient member 13 which resides at the lower end portion 22 thereof doubles as the resilient material 22a which is filled in the gap Cr.

Incidentally, as shown in FIG. 2, the outer tube 40 is configured such that a stopper St, which restricts the rebound of the engine Eg, is further superposed on the inner tube mounting flanges 43, 43 from above the inner tube flanges 33, 33 and are then fastened together with the flanges 33, 33, 43, 43 with the bolts 51 . . . .

Thus, the bolts 51 . . . function not only as the connecting members which fix the inner tube 30 to the outer tube 40 but also as the connecting member which fix the stopper St to the outer tube 40. Due to this, the number of bolts 51 . . . as the connecting members can be reduced.

Note that when the engine mount 10 is seen from the top as shown in FIG. 1, assume that a straight line extending in a direction indicated by a thick white arrow outlined with a black solid line to thereby pass through the axial center CL of the engine mount 10 is L1 and a straight line passing through the axial center CL to thereby intersect with the straight line L1 at right angles is L2. The inner tube mounting flanges 43, 43 and the bolts 51 . . . reside on the straight line L2.

The engine bracket Be (refer to FIG. 1) is such as to be mounted to the first mount member 11 on the straight line L1 (namely, in the direction of the straight line L1). The stopper St is such as to be mounted to the left and right inner tube mounting flanges 43, 43 on the straight line L2.

Figure 5:
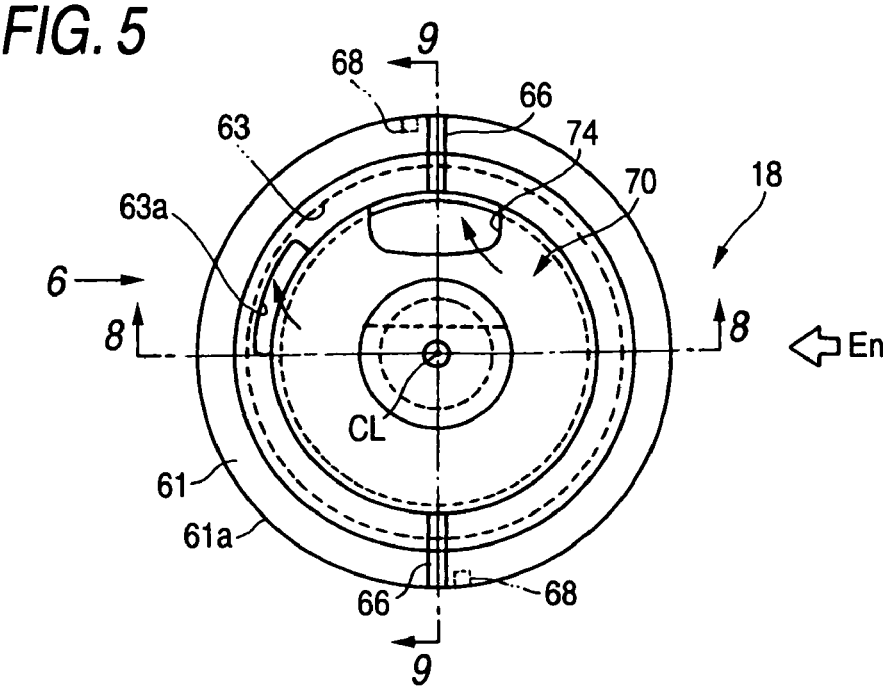
FIG. 5 is a plan view of a partition member according to the invention.
Figure 6:
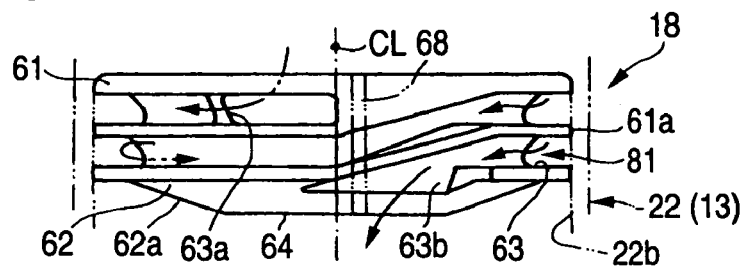
FIG. 6 is a drawing as seen from a direction indicated by an arrow 6 in FIG. 5.
Figure 7:
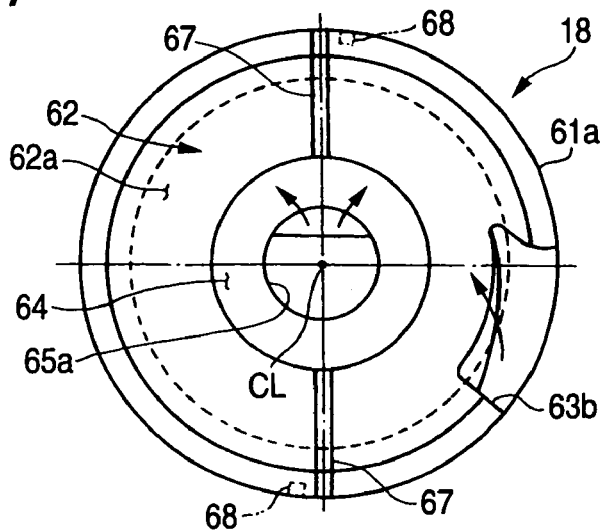
FIG. 7 is a bottom view of the partition member according to the invention.
Figure 8:
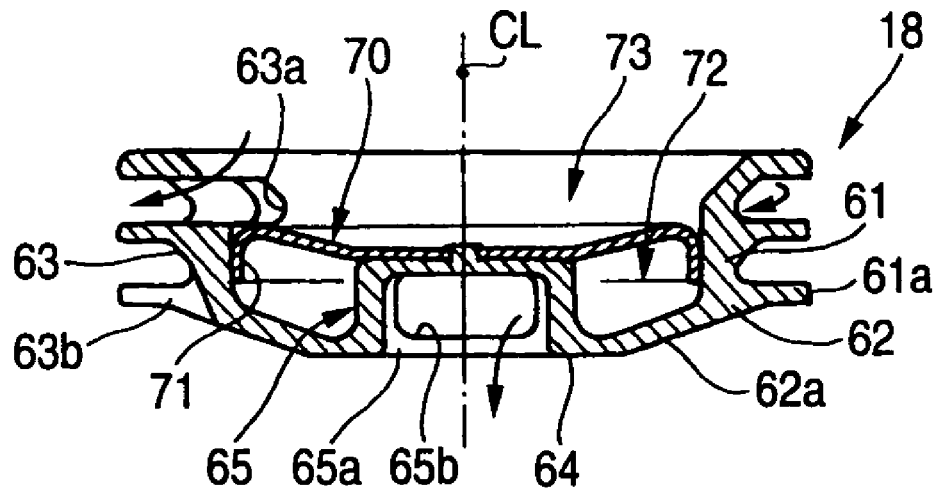
FIG. 8 is a sectional view taken along the line 8-8 in FIG. 5.
Figure 9:
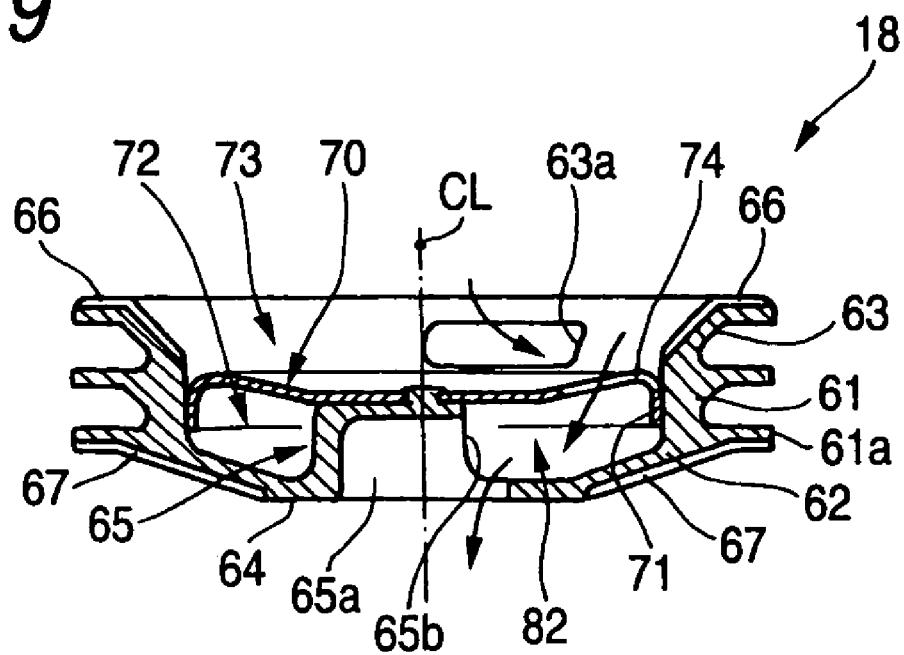
FIG. 9 is a sectional view taken along the line 9-9 in FIG. 5.

FIG. 5 is a plan view of the partition member according to the invention, FIG. 6 is a view as seen in a direction indicated by an arrow 6 in FIG. 5, FIG. 7 is a bottom view of the partition member according to the invention, FIG. 8 is a sectional view taken along the line 8-8 in FIG. 5, and FIG. 9 is a sectional view taken along the line 9-9 in FIG. 5.

As shown in FIGS. 5 to 9, the partition member 18 is a round and substantially cup-like member which is concentric with the axial center CL of the second mount member 12 (refer to FIG. 3) and is characterized in that a bottom plate 62 of the cup-like member is formed into a tapered shape which protrudes downward so as to make the bottom plate 62 constitute a second brittle portion.

To be specific, the partition member 18 is an integral molded product which is made up of a cylindrical side wall 61 and the bottom plate 62 and in which a side of the partition member 18 which faces the resilient member 13 (refer to FIG. 3) is made to open, whereas an opposite side thereof is closed by the bottom plate 62. The thickness of the side wall 61 and the thickness of the bottom plate 62 are generally uniform. The partition member 18, which is configured as is described above, is made up of a light member such as a cast product of an aluminum alloy and a molded product of a resin.

The side wall 61 has a spiral outer circumferential groove 63 which is formed on an outer circumferential surface 61*a* thereof. An end 63*a* of the outer circumferential groove 63 communicates with an upper portion on an inner surface of the side wall 61. The other end 63*b* of the outer circumferential groove 63 communicates with a lower surface 62*a* of the tapered shape on the bottom plate 62.

On the bottom plate 62, a horizontal flat valve seat 64 is formed on the lower surface 62*a* at a position in the vicinity of the axial center CL, and a swelling portion 65 is formed which swells from a central portion of the bottom plate 62 towards the resilient member 13 (refer to FIG. 3), whereby a cover plate 70 is superposed on a swelling end face of the swelling portion 65 so as to be fixed thereto by virtue of clamping or the like.

The swelling portion 65 exhibits a cup-like shape which faces downward, and an opening on a lower side thereof faces the valve seat 64. The swelling portion 65 has a communication port 65*b* which penetrates it transversely to establish a communication between an inside and an outside thereof in part of a side portion thereof.

Furthermore, the partition member 18 is characterized by including at least one of a first pair of slits 66, 66 formed in an axial upper end face (an upper surface of the side wall 61) thereof, a second pair of slits 67, 67 formed in an axial lower end face thereof and a third pair of slits 68, 68 (shown by imaginary lines) formed axially in the outer circumferential surface 61*a*. The first slits 66, 66 and the second slits 67, 67 are thin transversely elongated through grooves which pass through the axial center CL. The third slits 68, 68 are thin vertically elongated through grooves which penetrate vertically through the partition member 18. The sectional shapes and sizes of these slits 66 to 68 may be set appropriately so as to provide an optimal effect.

As shown in FIG. 5, when looking at the partition member 18 from above, in the event that the impact energy En is applied from a direction which intersects with the axial direction (the axial center CL) of the engine mount 10 at right angles, that is, a direction indicated by a thick white arrow outlined with a black solid line, the slits 66 to 68 are to be disposed in such a manner that the phases thereof deviate through about 90° relative to the direction indicated by the thick white arrow outlined with the black solid line.

The first slits 66, 66 function as a third brittle portion. The second slits 67, 67 function as a fourth brittle portion. The third slits 68, 68 function as a fifth brittle portion. The third, fourth and fifth brittle portions are such as to be deformed or broken as a result of the concentration of stress which results when the impact energy En (load) of a certain magnitude or greater is applied thereto from the direction which intersects with the axial direction (the axial center CL) of the engine mount 10 at right angles.

The cover plate 70 is a plate material which is made up of a light member such as an aluminum alloy plate and a molded product of a resin and is folded back at an outer circumferential edge portion 71 so as to be fitted in the inner surface of the side wall 61. By adopting this construction, a space inside the partition member 18 can be partitioned by the cover plate 70 into a lower space 72 which faces the swelling portion 65 and an upper open space 73. Furthermore, the cover plate 70 has a communication hole 74 which establishes a communication between the lower space 72 and the open space 73. Note that the end 63*a* of the spiral outer circumferential groove 63 is to communicate with the open space 73.

As shown in FIGS. 3 and 6, the outer circumferential surface 61*a* of the partition member 18 is caused to slightly bite into an inner wall surface 22*b* of the lower end portion 22 by press fitting the partition member 18 into the cylindrical lower end portion 22 of the resilient member 13, so that the partition member 18 can be fixed to the resilient member 13 while ensuring the sealing properties with respect to fluid. Thus, a spiral passageway 81 is defined by the spiral outer circumferential groove 63 and the inner wall surface 22*b* of the lower end portion 22.

Since the hollow spiral passageway 81 is defined by closing an outer circumferential side of the outer circumferential groove 63 by the inner wall surface 22*b*, the construction of the partition member 18 becomes simple and the fabrication of the partition member 18 becomes easy compared with a case where the hollow spiral passageway 81 is integrally formed in the interior of the partition member 18. Moreover, since there is no need to provide on the partition member 18 a portion which is to close the outer circumferential side of the outer circumferential groove 63, the partition member 18 can be made smaller in size by such an extent.

As is clear from the description that is made heretofore, the main fluid chamber 16 is made up of the cavity portion 23 and the open space 73.

The spiral passageway 81 makes up a first orifice. Hereinafter, the spiral passageway 81 is appropriately referred to as a first orifice. The first orifice 81 is a normally communicating orifice which communicates at all times.

In addition, as shown in FIG. 9, passageways which are constructed by combinations of the communication hole 74 in the cover plate 70, the lower space 72, the communication port 65*b* and an opening 65*a* of the swelling portion 65 and which communicate with each other make up a second orifice 82. The second orifice 82 is an idling orifice which is made to establish a communication when the engine EG (refer to FIG. 1) is idling.

Thus, the first and second orifices 81, 82 are provided in the partition member 18 which establish a communication between the main fluid chamber 16 and the auxiliary fluid chamber 17.

As shown in FIG. 3, the diaphragm 14 is made of a resilient material such as a rubber so as to be displaced in the axial direction of the engine mount 10, provided in such a manner as to face the partition member 18 and has a valve element 91 formed integrally therewith in such a manner as to be brought into contact with the valve seat 64. The diaphragm 14, which is so constructed, is configured so as to fit in the inner tube 30 to thereby be fixed to the second mount member 12 by clamping a lower end of the inner tube 30. Reference numeral 92 denotes a core metal of the diaphragm 14.

Furthermore, the engine mount 10 is, as shown in FIG. 2, made up of an actuator 100 for driving the diaphragm 14 to open and close the opening 65a of the second orifice 82 and an actuator drive source 140 for applying an operational force to the actuator 100.

The actuator 100 is made up of a lower support plate 110 which is disposed below the diaphragm 14 within the outer tube 40, a resilient drive element 120 which is fixed to the lower support plate 110 so as to drive the diaphragm 14 and a compression coil spring 131 which spring biases the resilient drive element 120 toward the diaphragm 14. A space portion 132 is defined by the diaphragm 14 and the lower support plate 110.

As shown in FIGS. 2 and 3, the resilient drive element 120 is made of a resilient material such as a rubber so as to be displaced in the axial direction of the engine mount 10, exhibits a substantially top hat-like sectional shape and has at an upper end thereof a pressing portion 121 which presses the valve element 91 upward. The resilient drive element 120, which is configured as is described above, is a diaphragm which partitions the space portion 132 into an atmosphere communicating chamber 133 which faces the diaphragm 14 and a valve opening and closing pneumatic chamber 134 which faces the lower support plate 110.

The compression coil spring 131 is interposed between the lower support plate 110 and the pressing portion 121.

The atmosphere communicating chamber 133 communicates with the atmosphere. The valve opening and closing pneumatic chamber 134 communicates with an actuator drive source 140 via a connection port 112a provided in the lower support plate 110.

The actuator drive source 140 is such as to generate a negative pressure in the valve opening and closing pneumatic chamber 134 by making use of, for example, manifold air pressure of the engine EG.

Figure 10A:
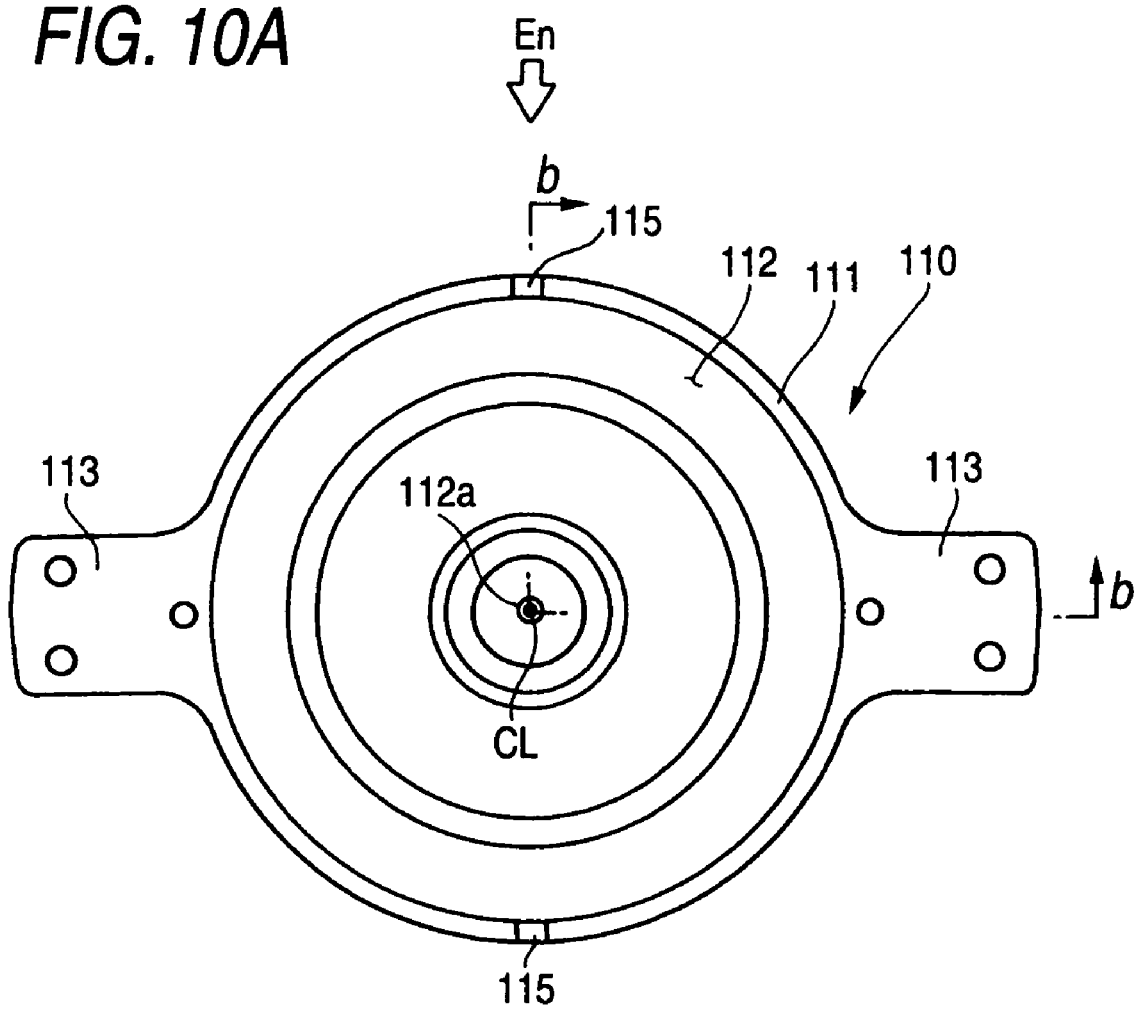
FIGS. 10A and 10B are drawings showing the configuration of a lower support plate according to the invention.
Figure 10B:
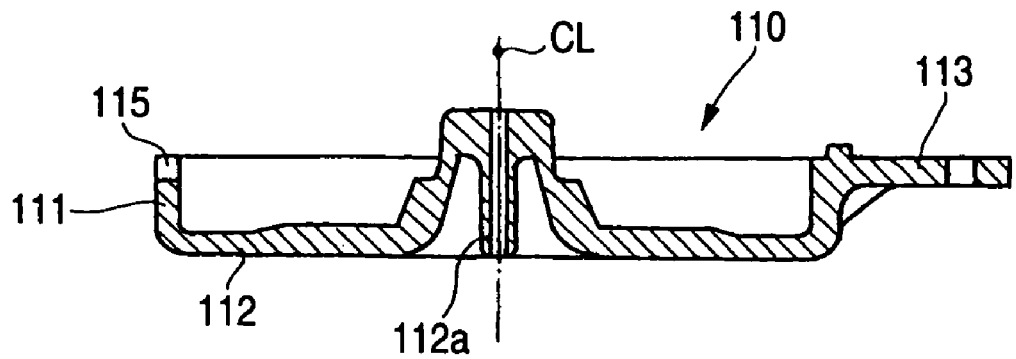

FIGS. 10A and 10B are drawings showing the configuration of the lower support plate 110 according to the invention, in which FIG. 10A shows a configuration of the lower support plate 110 as viewed from the top, and FIG. 10B shows a sectional configuration thereof taken along the line b-b in FIG. 10A.

As shown in FIGS. 3 and 10, the lower support plate 110 is a substantially dish-like member and is made up of a light member such as a cast product of an aluminum alloy and a molded product of a resin.

The lower support plate 110, which is configured as is described above, is an integral molded product made up of an annular side plate 111, a bottom plate 112 which closes a lower portion of the side plate 111 and flanges 113, 113 which extend from an upper end of the side plate 111 to left and right sides. As shown in FIGS. 1, 2 and 10, the lower support plate 110 can be fixed to the second mount member 12 by superposing the flanges 113, 113 on plate mounting flanges 46, 46 from therebelow so that the flanges 113, 113 can be mounted on the plate mounting flanges 46, 46 with connecting members such as a plurality of rivets 114 . . . . Note that the fixing construction of the lower support plate 110 to the second mount member 12 may adopt not only the fixing construction with the connecting members but also fixing constructions using welding, bonding and press fitting.

Furthermore, as shown in FIG. 10, the lower support plate 110 has slits 115, 115 formed in an axial upper end face thereof, so that the slits 115, 115 are made to function as a brittle portion. The slits 115, 115 are thin elongated transverse through holes which pass through the axial center CL. The sectional shape and size of the slits 115, 115 may be set appropriately so as to exhibit an optimal effect.

As shown in FIG. 10A, when looking at the lower support plate 110 from the top, in a case where the impact energy En is to be applied thereto from a direction which intersects with the axial direction (the axial center CL) of the engine mount 10 at right angles, that is, a direction indicated by a thick white arrow outlined with a black solid line, the slits 115, 115 are disposed in the direction indicated by the thick white arrow outlined with the black solid line.

This brittle portion is such as to be deformed or broken as a result of the concentration of stress which results when impact energy En (load) of a certain magnitude or greater is applied to the lower support plate 110 in the direction which intersects with the axial direction (the axial center CL) of the engine mount 10 at right angles.

As is described above, the second mount member 12 is, as shown in FIGS. 2 and 3, such that the inner tube 30 which is integrated with the resilient member 13 is integrally connected to the outer tube 40 with the bolts 51 . . . . The diaphragm 14 is configured so as to be fixed to the inner tube 30. The partition member 18 is configured so as to be press fitted in the resilient member 12 and is, as result thereof, fixed in place within the inner tube 30. The resilient drive element 120 is configured so as to be fixed to the outer tube 40 with a bolt.

Consequently, it can be said that these diaphragm 14, partition member 18 and resilient drive element 120 are members that are fixed to the second mount member 12.

Next, a vibrations absorbing function by the engine mount 10 that is constructed as is described heretofore will be described.

As shown in FIG. 2, when the engine EG is revolving in high revolution speed areas (revolution speed areas which exceed the idle speed area), no manifold air pressure is applied from the actuator drive source 140. Respective pressures in the atmosphere communicating chamber 133 and the valve opening and closing pneumatic chamber 134 are both at the atmospheric pressure. The valve element 91 closes the opening 65a of the second orifice 82 due to the compression coil spring 131 spring biasing the diaphragm 14 via the resilient drive element 120. Due to this, the working fluid Lg in the main fluid chamber 16 and the auxiliary fluid chamber 17 cannot pass through the second orifice 82. The working fluid Lg flows between the main and auxiliary fluid chambers 16, 17 only through the first orifice 81 (refer to FIG. 6, as well), and the resilient member 13 is deformed resiliently, whereby vibrations of the engine EG which is revolving at high revolution speeds, that is, vibrations in the normal vibration region can be damped.

When the engine EG is revolving in the low revolution speed area (the idle speed area), a manifold air pressure is applied from the actuator drive source 140. Since the pressure in the valve opening and closing pneumatic chamber 134 becomes negative, the resilient drive element 120 and the valve element 91 lower against the spring force of the compression coil spring 131. As a result, the valve element 91 opens the opening 65a of the second orifice 82. The working fluid Lg in the main fluid chamber 16 and the auxiliary fluid chamber 17 can pass through the second orifice 82. The working fluid Lg can flow between the main and auxiliary fluid chambers 16, 17 while passing through both the first and second orifices 81, 82, and the resilient member 13 is deformed resiliently, whereby vibrations of the engine EG which is revolving in the idle speed area, that is, vibrations in the idle vibration region can be damped.

Next, an impact energy absorbing function by the engine mount 10 which is configured as is described above will be described based on FIGS. 1 and 2.

When the vehicle is involved in a collision, an impact energy En is applied to the engine mount 10 which is interposed between the body BD and the engine EG which are deformed by the impact energy.

To cope with this, the engine mount 10 is configured so as to have the brittle portions 45, 62, 66, 67, 68 (refer to FIG. 5) provided in such a manner as to be deformed or broken when an impact energy En (an impact load En) of a certain magnitude or greater is applied to at least one of the second mount member 12 and the partition member 18 in the direction which intersects with the axial direction of the engine mount 10 at right angles (the direction indicated by the thick white arrow outlined with the black solid line).

Consequently, when the impact energy En is applied to the engine mount 10, the second mount member 12 and/or the partition member 18 can be deformed or broken earlier than the other members. As a result of this, the impact energy En absorbing performance by the engine mount 10 can be enhanced sufficiently.

Furthermore, as shown in FIG. 4, the engine mount 10 is such that one or the plurality of axial slits 45 are formed in the portion 44a to which the impact energy En is applied on the outer circumferential surface 44 of the outer tube 40 of the second mount member 12, so that the slits 45 so formed function as the brittle portion.

When the impact energy En is applied to the second mount member 12 from the direction which intersects with the axial direction of the engine mount, stress is concentrated on the portion 44a of the outer tube 40 which has the slits 45. Due to this, the outer tube 40 can easily be deformed or broken from the portion 44a having the brittle slits 45 as the base point. As a result of this, the entirety of the second mount member 12 is also deformed or broken, whereby the impact energy En can be absorbed sufficiently.

Furthermore, the brittle portion can be provided by the extremely simple construction in which only the slits 45 are formed in the outer circumferential surface 44 of the outer tube 44 of the second mount member 12.

Furthermore, as shown in FIGS. 2 and 3, since the engine mount 10 has the gap Cr between the outer surface 31 of the inner tube 30 and the inner surface 41 of the outer tube 40, when the impact energy En is applied from the direction which intersects with the axial direction of the engine mount 10 at right angles, the inner tube 30 does not restrain the outer tube 40 from being deformed in a radial direction. In addition, since the gap Cr is provided, there is no need to support the outer tube 40 with the inner tube 30 as in the case where the inner tube 30 is rigidly fitted (press fitted) in the outer tube 40, and hence no stress is generated which would otherwise be generated by the fit-in (press fit-in) load. Due to this, the thickness of the outer tube 40 can be made thin or reduced.

From this, the deformation of the outer tube 40 in the radial direction can be facilitated. As a result of this, the impact energy En can be absorbed sufficiently by virtue of the deformation or breakage of the second mount member 12. Moreover, since the outer tube 40 can easily be deformed in the radial direction, the maximum value (peak value) of energy at an initial stage where the impact energy En is applied to the engine mount 10 can be reduced.

Furthermore, since the resilient material 22a such as a rubber is filled in the cap Cr, the resonance of the inner tube 30 can be suppressed by the resilient material 22a.

Furthermore, as shown in FIGS. 5 to 9, the engine mount 10 is such that the partition member 18 is made up of the substantially dish-like member and the bottom plate 62 of the cup-like member is formed into the tapered shape, so that the bottom plate 62 is made to function as the second brittle portion.

As shown in FIG. 1, when the impact energy En is applied to the second mount member 12 from the direction which intersects with the axial direction of the engine mount 10, the impact energy En so applied is then made to act on the partition member 18 via the second mount member 12. Namely, the impact energy En is applied to the partition member 18 in such a manner as to compress it in the radial direction. Since the bottom plate 62 of the partition member 18 is formed into the tapered shape having the generally uniform thickness, the brittle portion formed as described above constitutes a brittle portion which is easy to be deformed plastically.

Thus, since the bottom plate 62 is made to function as the second brittle portion, the bottom plate 62 of the partition portion 18 can be deformed or broken earlier than the other members. As a result of this, the entirety of the partition member 18 is also deformed or broken, whereby the impact energy En can be absorbed sufficiently.

Furthermore, the second brittle portion can be provided by the extremely simple configuration in which the partition member 18 is made up of only the substantially dish-like member and the bottom plate 62 of the cup-like member is only formed into the tapered shape.

Furthermore, as shown in FIGS. 5 to 7, the engine mount 10 is such that at least one of the first pair of slits 66, 66 and the second pair of slits 67, 67 which are formed in the axial end faces of the partition member 18, and the third pair of slits 68, 68 formed axially in the outer circumferential surface 61a of the partition member 18 (one of the first, second and third pairs of slits) is provided in the partition member 18, so that these slits 66, 67, 68 are made to function as the brittle portion.

When the impact energy En is applied to the partition member 18, stress concentrates on the portions of the partition member 18 which have the slits 66, 67, 68. Due to this, the partition member 18 can be deformed or broken from the portions having the brittle slits 66, 67, 68 as the base points. As a result of this, the entirety of the partition member 18 is also deformed or broken, whereby the impact energy En can be absorbed sufficiently.

Furthermore, as shown in FIG. 10, the engine mount 10 is such that the slits 115, 115 are formed in the axial end face of the lower support plate, so that the slits 15, 15 are made to function as the brittle portion.

The impact energy En is applied to the lower support plate 110 via the second mount member 12. Namely, the impact energy En is applied to the lower support plate 110 in such a manner as to compress it in the radial direction. Stress is concentrated to the portion of the lower support plate 110 which has the slits 115, 115. Due to this, the lower support plate 110 can easily be deformed or broken from the portion having the brittle slits 115, 115 as the base point. As a result of this, the entirety of the lower support plate 110 is also deformed or broken, whereby the impact energy En can be absorbed sufficiently.

Furthermore, the brittle portion can be provided by the extremely simple configuration in which only the slits 115, 115 are formed in the lower support plate 110.

Note that in the embodiment of the invention, the first mount member 11 may be configured so as to be mounted on one of the power source EG and the body BD, and the second mount member 12 may be configured so as to be mounted on the other of the power source EG and the body BD.

The vehicular fluid sealed engine mount 10 of the invention is preferably applicable to the configuration in which the vehicular fluid sealed engine mount 10 is disposed between the front part of the body BD and the front part of the engine EG so as to support the engine EG while preventing the vibration thereof in the vehicle having the drive system in which the front wheels are driven by the engine EG installed in the front part of the body BD.

What is claimed is:

1. A vehicular fluid sealed engine mount comprising:
   a first mount member adapted to be mounted on one of a power source and a body of a vehicle;
   a second mount member which is cylindrical and is adapted to be mounted on the other of the body and the power source, said second mount member having a hollow space formed therein;
   a resilient member which connects between the first and second mount members;
   a diaphragm fixed to the second mount member spaced away from the resilient member;
   a fluid chamber defined by at least the resilient member and the diaphragm;
   a partition member fixed to the second mount member in such a manner as to partition the fluid chamber into a main fluid chamber which faces the resilient member and an auxiliary fluid chamber which faces the diaphragm; and
   an orifice provided in the partition member which communicates between the main fluid chamber and the auxiliary fluid chamber, wherein:
   the second mount member comprises a cylindrical inner tube which is integrated with the resilient member and a cylindrical outer tube which accommodates therein the inner tube and which is mounted on the body, a gap is provided between an outer surface of the inner tube and an inner surface of the outer tube, and the inner tube and the outer tube are directly connected to each other by superposing a mounting surface of the inner tube on the outer tube in an axial direction of the engine mount;
   brittle portions are provided on the second mount member and the partition member;
   the brittle portion provided on the second mount member is adapted to be deformed or broken during operation of the vehicle when a load of a certain magnitude or larger is applied thereto in a direction which intersects with an axial direction of the vehicular fluid sealed engine mount at right angles;
   the brittle portions on the second mount member and the partition member are constituted by slits;
   the brittle portions on the partition member are extends along an axial direction of the second mount member and is provided on an outer circumferential surface to which an impact energy is applied upon collision of the vehicle;
   the partition member is substantially cylindrical, is concentric with the second mount member, and a bottom plate thereof is formed into a tapered shape; and
   the slits constituting at least one of the slits of the second mount member disposed in such a manner that phases thereof are deviate through about 90° relative to a direction of the impact energy.

2. The vehicular fluid sealed engine mount as set forth in claim 1, wherein a resilient material is filled in the gap.

3. The vehicular fluid sealed engine mount as set forth in claim 2, wherein the resilient material is a rubber.

4. The vehicular fluid sealed engine mount as set forth in claim 1, wherein the partition bottom plate thereof formed into a tapered shape has a generally uniform thickness.

5. The vehicular fluid sealed engine mount as set forth in claim 1, wherein the gap between the outer surface of the inner tube and the inner surface of the outer tube is partially open and partially filled with a resilient material.

* * * * *